United States Patent [19]
Carmack et al.

[11] Patent Number: 6,049,836
[45] Date of Patent: Apr. 11, 2000

[54] METHOD AND APPARATUS FOR AUTOMATIC CONTROL OF INSTRUMENTS THROUGH VIDEO SIGNALS

[75] Inventors: Richard O. Carmack, Indianapolis; Howard Clarence Freeman, Noblesville; Charles V. Green, Indianapolis; David S. Herron, Indianapolis; Darren Carl Martin, Indianapolis; G. Scott Rulong, Indianapolis; Mark J. Simmons, Carmel; Karl Szabo, Fishers; Raymond E. Szkotak, Indianapolis; Li-Wun Chen Tam, Carmel; Robert C. Uleski, Noblesville; Frank W. Wagle, Indianapolis; Stephen T. West, Indianapolis, all of Ind.

[73] Assignee: Roche Diagnostics Corporation, Indianapolis, Ind.

[21] Appl. No.: 08/209,522

[22] Filed: Mar. 10, 1994

[51] Int. Cl.[7] .............................. G06F 13/38; G06F 15/17
[52] U.S. Cl. ............................................................ 709/246
[58] Field of Search ............................. 341/99; 348/441, 348/460, 473–74, 552; 395/153, 200, 275, 500, 800

[56] References Cited

U.S. PATENT DOCUMENTS

| 4,635,222 | 1/1987 | Tonui et al. | 395/114 |
|---|---|---|---|
| 4,754,428 | 6/1988 | Schultz et al. | 395/275 |
| 5,157,769 | 10/1992 | Eppley et al. | 395/200 |
| 5,287,455 | 2/1994 | Rosenthal | 395/200 |
| 5,299,314 | 3/1994 | Gates | 395/200 |
| 5,321,817 | 6/1994 | Frinstein | 395/325 |
| 5,404,452 | 4/1995 | Detschel et al. | 395/250 |

OTHER PUBLICATIONS

Boehringer Mannheim Corporation, Boehringer Mannheim/Hitachi 717 System, 1990.

*Primary Examiner*—Mark H. Rinehart
*Assistant Examiner*—Lance L. Barry

[57] ABSTRACT

A method and apparatus for providing communication between a first machine and a second machine comprises the steps of, and apparatus for, coupling a first video display output of the first machine to a first input port of the second machine, converting first video display signals generated by the first machine at the first video display output into first instructions and data and using the first instructions and data to operate the second machine.

24 Claims, 11 Drawing Sheets

METHOD AND APPARATUS FOR AUTOMATIC CONTROL OF INSTRUMENTS THROUGH VIDEO SIGNALS

FIELD OF THE INVENTION

This invention relates to methods and apparatus or interfacing first control equipment having a first computational and storage capacity with second control equipment having a second computational and storage capacity to enhance the performance and/or extend the useful life of the combined equipment. It is disclosed in the context of an enhancement for a laboratory analyzer for biological fluids such as blood, sera and the like, but is believed to be useful in other fields as well.

BACKGROUND OF THE INVENTION

Microcontroller($\mu$C)-controlled instruments are presently in use in many applications. In many cases, these instruments have been in use for several years with software developed prior to their initial installation. The capacities of many such instruments have, in many cases, been reached or exceeded by the demands of their applications, and yet the instruments have not been replaced. In some instances, cost is a significant factor in the decision to continue using such an instrument the capabilities of whose computational hardware, or software, or both, have been reached or exceeded.

Frequently, the designers of the hardware or software the capacity of which has been reached or exceeded are no longer available to assist in upgrading software and/or hardware to improve its capacity. In other cases the designers of such hardware or software choose not to cooperate with a distributor or user in upgrading hardware or software to improve instrument capability. In most instances, the instrument systems; are provided with user interfaces such as video and keyboard or keypad ports through which video display terminals and keyboards or keypads can be coupled into the systems. These give users the ability to monitor system operations and enter instructions and data into the system.

It is a primary object of the invention to use such interfaces to extend and enhance the flexibility, capacity and computational power of such systems.

SUMMARY OF THE INVENTION

According to an aspect of the invention, a method for providing communication between first and second machines comprises coupling a first display output of the first machine to a first input port of the second machine, converting first display signals generated by the first machine at the first display output into first:

instructions and data, and using the first instruction and data to operate the second machine.

Illustratively according to this aspect of the invention, the second machine has a second display output. The steps of converting the first display signals into first instructions and data and using the first instructions and data to operate the second machine comprise converting the first display signals into first instructions and data and using the first instructions and data to provide second display signals at the second display output.

Additionally illustratively according to this aspect of the invention, the method further comprises the steps of entering the second instructions and data at a second input port of the second machine, converting the second instructions and data in the second machine into third instructions and data, providing the third instructions and data to a third input port of the first machine, and using the third instructions and data to operate the first machine.

Further illustratively according to this aspect of the invention, the step of coupling a first display output of the first machine to a first input port of the second machine comprises coupling a first video display output of the first machine to a first input port of the second machine.

Additionally illustratively according to this aspect of the invention, the step of using the first instructions and data to provide second display signals at the second display output comprises using the first instructions and data to provide second video display signals at the second display output.

Illustratively according to this aspect of the invention, the step of entering the second instructions and data at a second input port of the second machine comprises coupling a keyboard to the second input port of the second machine and entering the second instructions and data through the keyboard.

According to another aspect of the invention, a method is provided for distinguishing among the characters of a character set. The characters of the set are represented by a data stream to a display port. The data stream is capable of causing the characters to be displayed by a display coupled to the display port as selected pixels from m columns of pixels in n horizontal lines. The method comprises determining which pixels uniquely identify each respective character of the set, examining only data in the data stream corresponding to those pixels, and identifying a respective character based upon the states of said data corresponding to those pixels.

According to another aspect of the invention, a system for providing communication between a first machine and a second machine comprises first means for coupling a first display output of the first machine to a first input port of the second machine, second means for converting first display signals generated by the first machine at the first display output into first instructions and data, and third means for using the first instructions and data to operate the second machine.

Illustratively, according to this aspect of the invention, the second machine comprises a second display output, the second and third means converting the first display signals into first instructions and data and using the first instructions and data to provide second display signals at the second display output.

Further illustratively, the second machine comprises a second input port. The system further comprises fourth means for entering second instructions and data at the second input port of the second machine, and fifth means for converting the second instructions and data in the second machine into third instructions and data and for providing the third instructions and data to a third input port of the first machine. The first machine uses the third instructions and data to operate the first machine.

Additionally, illustratively, the first display output comprises a first video display output.

Further, illustratively, the second and third means comprise means for providing second video display signals at the second display output.

Illustratively, the fourth means comprises a keyboard coupled to the second input port of the second machine.

According to another aspect of the invention, a system is provided for distinguishing among the characters of a character set, the characters of which are represented by a data stream to a display port. The data stream is capable of causing the characters to be displayed by a display. The system comprises means for coupling the data stream to the display port, means for examining only data in the data stream corresponding to those pixels from m columns of pixels in n rows which uniquely identify each respective character of the set, and means for identifying a respective character based upon the states of said data corresponding to those pixels.

BRIEF DESCRIPTION OF THE DRAWINGS

The invention may best be understood by referring to the following detailed description and accompanying drawings which illustrate the invention.

DETAILED DESCRIPTION OF AN ILLUSTRATIVE EMBODIMENT

The following schematic and block circuit diagram descriptions identify specific integrated circuits and other components and in many cases specific sources for these. Such identifications are not intended in any way to limit the scope of this invention. Specific terminal and pin names and numbers are generally given in connection with these for the purposes of completeness. It is to be understood that these terminal and pin identifiers are provided for these specifically identified components. It is to be understood that this does not constitute a representation, nor should any such representation be inferred, that the specific components or sources are the only components available from the same or any other sources capable of performing the necessary functions. It is further to be understood that other suitable components available from the same or different sources may not use the same terminal/pin identifiers as those provided in this description.

Figure 4:
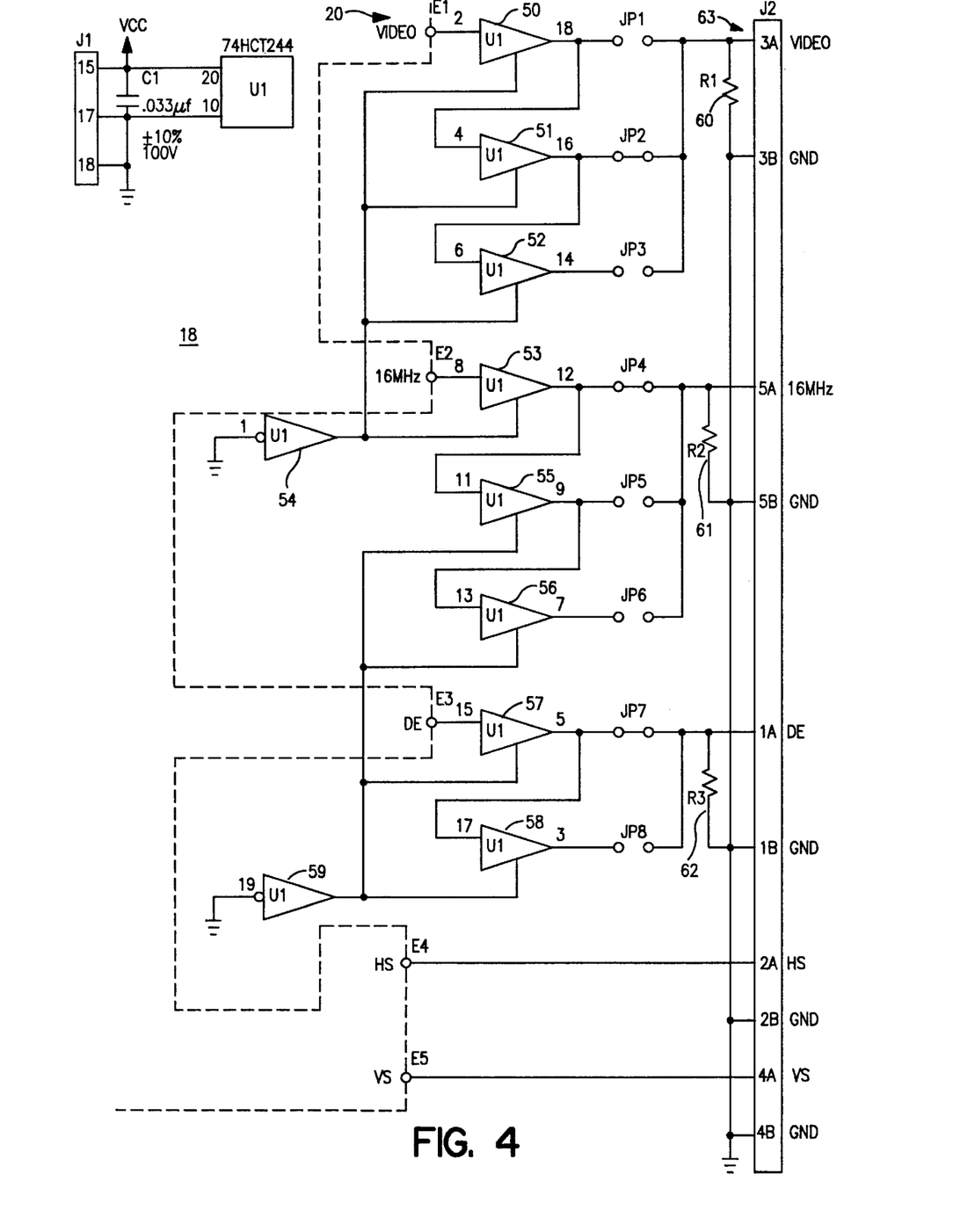
FIGS. 4 and 5a–5e illustrate partly block and partly schematic diagrams of an electronic circuit realization of a system constructed according to the present invention.
Figure 5A:
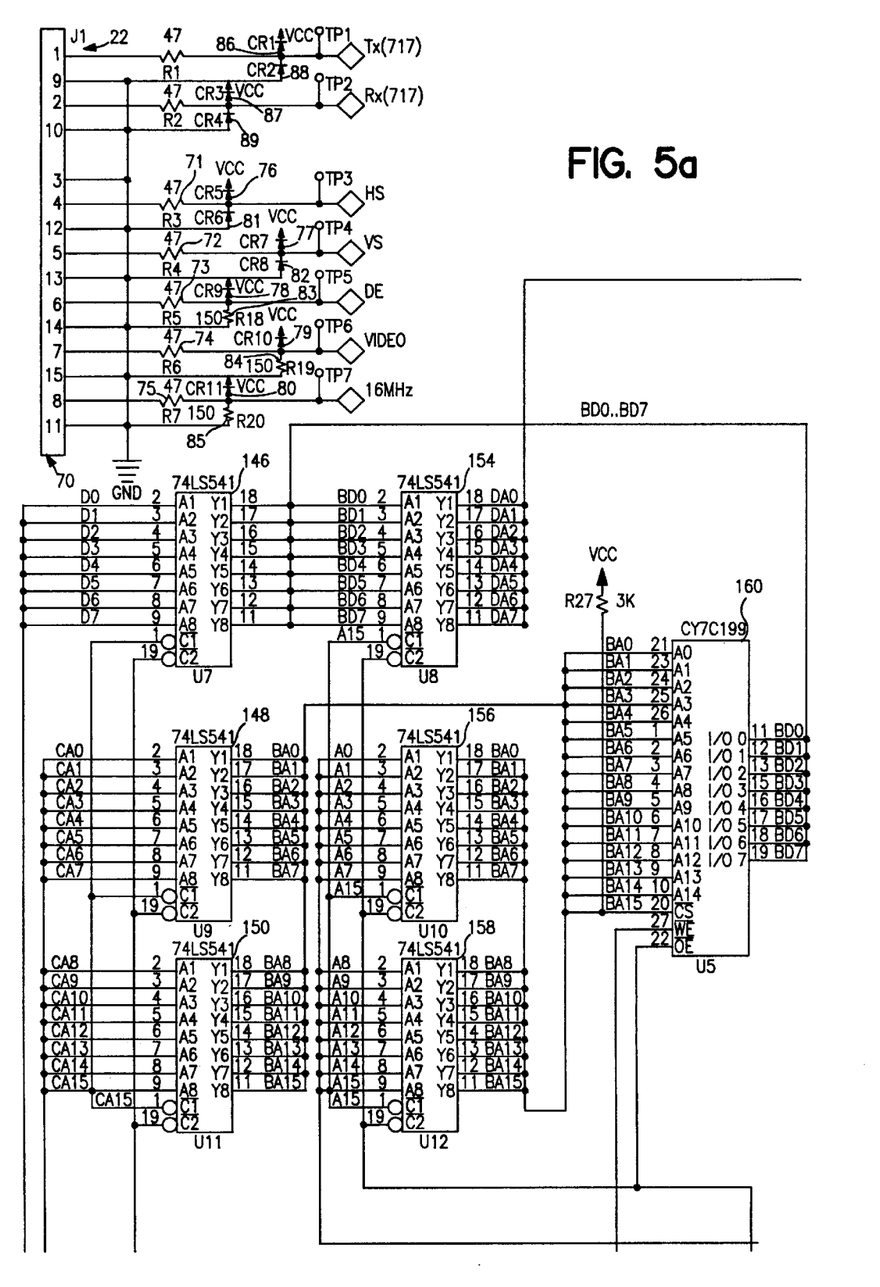

Referring briefly to FIGS. 4 and 5a, the invention is disclosed in the context of the Hitachi Model 717 laboratory analyzer (hereinafter 717) available from Boehringer Mannheim Corporation, 9115 Hague Road, P.O. Box 50457, Indianapolis, Ind. 46250-0457. This instrument measures quantities of biological fluids, sera and the like, into reaction vessels with reagents which initiate reactions with the fluids, incubates these reactants for predetermined periods of time, conducts photometric analyses of the reacted fluids and then disposes of the reacted fluids, all under the control of an imbedded 68000 series $\mu$C 18. The 717 includes a built-in keypad (not shown) with alphanumeric and function keys. The term keyboard will be used hereinafter to refer to keyboards, keypads and like data entry devices. The keyboard permits an operator to enter certain instructions and data during the 717's operating sequence. The keyboard is coupled to the imbedded $\mu$C 18 through a keyboard port on the $\mu$C 18. A display port is also provided on the $\mu$C 18. The display port provides video signals to a video display terminal (not shown) to which the operator can refer to interact with the 717.

Figure 1A:
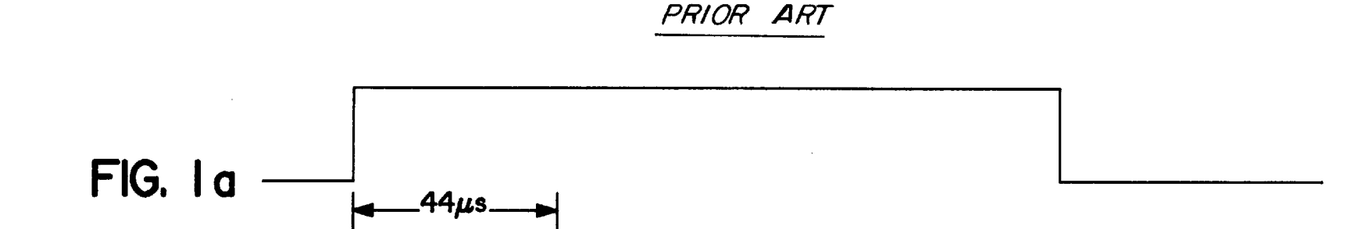
FIGS. 1a–d illustrate video waveform data useful in understanding the invention.
Figure 1B:
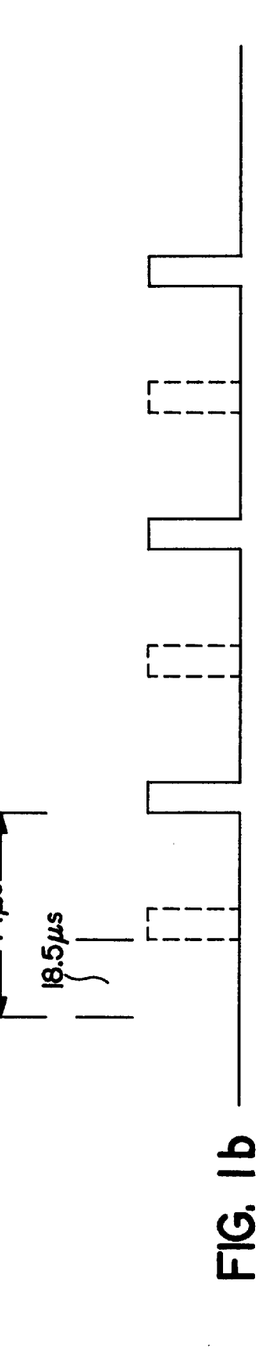
Figure 1C:
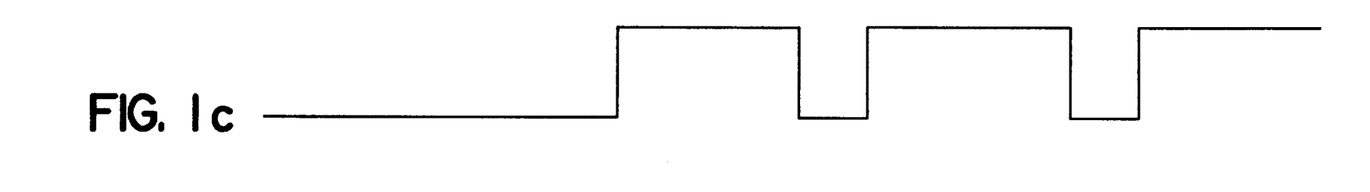

The 717 includes a video output port 20 and a keyboard input/output (I/O) port 22. The video data at the output port 20 is in the format illustrated in FIGS. 1a–d. FIG. 1a illustrates the vertical synchronizing signal (VS) which synchronizes each field of the display. The first horizontal synchronizing pulse (HS) for the odd field appears 18.5 $\mu$sec after the leading edge of the VS. FIG. 1b. The first HS for the even field appears 44 $\mu$sec. after the leading edge of the VS. The display enable signal (DE—FIG. 1c) is positive whenever raw video (FIG. 1d) is to be displayed.

Figure 2:
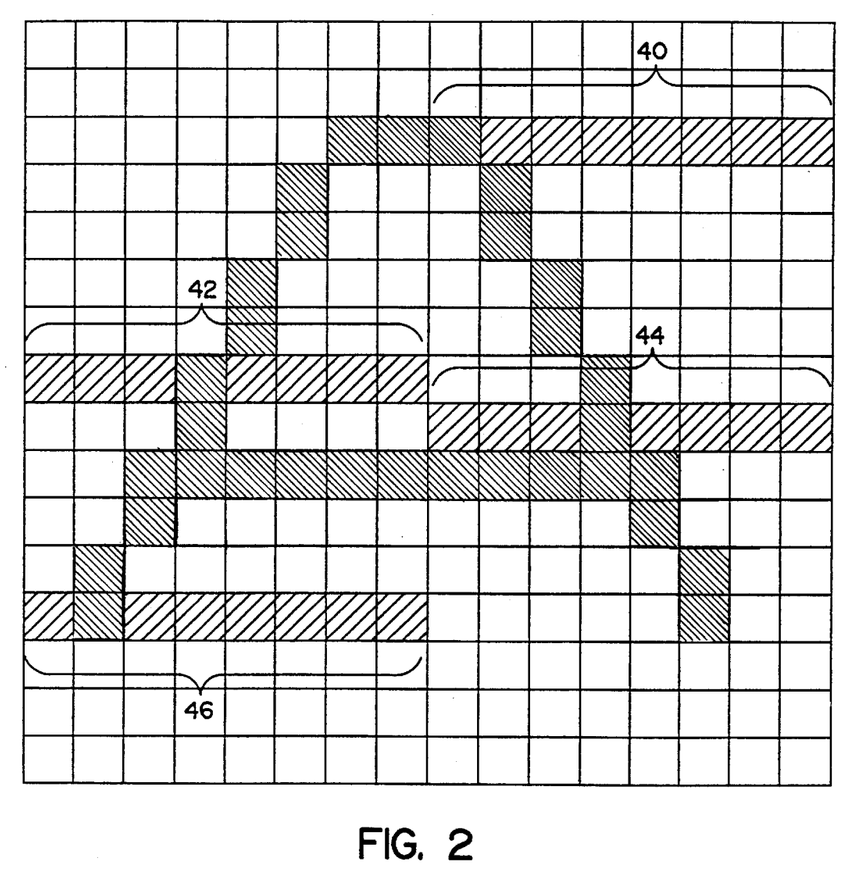
FIG. 2 illustrates an analysis of an illustrative character on a video display.
Figure 7:
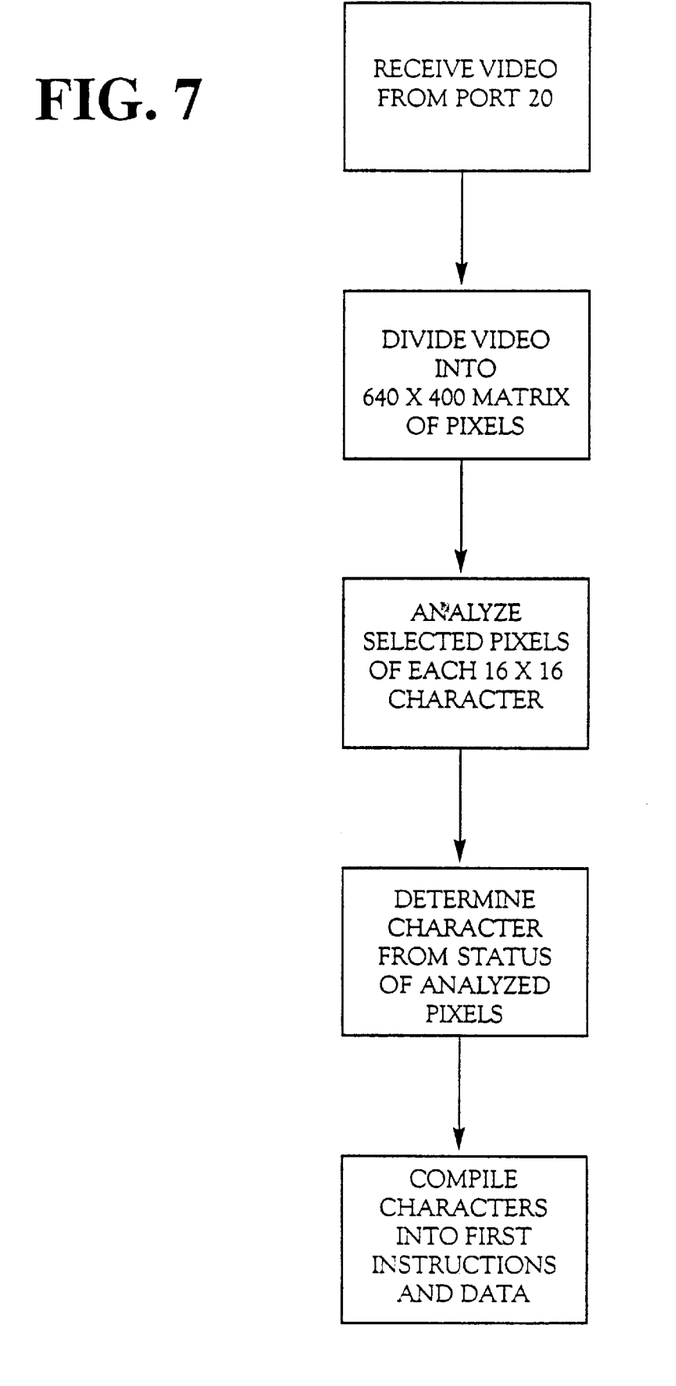

Referring now to FIG. 7, each character of the 717 character set is displayed as some number of pixels of a sixteen pixel-by-sixteen line field on the video raster. The 717 raster is 640 pixels (640/16, or forty, characters) wide and 400 lines (400/16, or twenty-five, characters) high. The 717 character set includes 77 characters. An illustrative character, A, is illustrated enlarged but otherwise in the form in which it is actually displayed, in FIG. 2. The pixels of the 16-by-16 character array are illustrated for purposes of understanding this explanation. The pixels of the character, A, are darkened. Four eight pixel-long "bytes" 40, 42, 44, 46 are also shaded. As it happens, almost every character of the character set of the 717 can be distinguished from all other characters of the 717 character set by examining the contents of these four bytes of the video signal at port 20. That is, the contents of these four bytes 40, 42, 44, 46 are different for most characters of the 717 character set, and thus distinguish most characters of the 717 character set from all other characters of the 717 character set. In certain circumstances, such as to distinguish an "S" from an "8" or to distinguish a ":" from a "=", it may be necessary to examine one additional byte. However, that additional byte will vary from character pair to character pair.

Consequently, the interface to a 717 computational and storage capacity enhancement system according to the present invention ordinarily need only examine bytes 40, 42, 44, 46 of video at port 20 to establish what character is being sent from port 20. The keyboard of the 717 is provided with a 77 character set, the binary and hexadecimal key codes of which are illustrated in Table 1.

TABLE 1

| KEYCODE DATA | | |
|---|---|---|
| KEY | KEY-CODE | HEX |
| Q (A) | 10000000 | 80 |
| W (B) | 10000001 | 81 |
| E (C) | 10000010 | 82 |
| R (D) | 10000011 | 83 |
| T (E) | 10000100 | 84 |
| Y (F) | 10000101 | 85 |
| U (G) | 10000110 | 86 |
| I (H) | 10001000 | 88 |
| O (I) | 10001001 | 89 |
| P (J) | 10001010 | 8A |
| ( (K) | 10001011 | 8B |
| ) (L) | 10001100 | 8C |
| " (1) | 10001101 | 8D |
| A (2) | 10001110 | 8E |
| S (3) | 10001111 | 8F |
| D (4) | 10010000 | 90 |
| F (5) | 10010001 | 91 |
| G (6) | 10010010 | 92 |
| H (7) | 10010011 | 93 |

TABLE 1-continued

KEYCODE DATA

| KEY | KEY-CODE | HEX |
|---|---|---|
| J (8) | 10010100 | 94 |
| K (9) | 10010101 | 95 |
| L (10) | 10010110 | 96 |
| ; (11) | 10010111 | 97 |
| . (12) | 10011000 | 98 |
| ? (13) | 10011001 | 99 |
| ! (14) | 10011010 | 9A |
| Z (15) | 10011011 | 9B |
| X (16) | 10011100 | 9C |
| C (17) | 10011101 | 9D |
| V (18) | 10011110 | 9E |
| B (19) | 10011111 | 9F |
| N (20) | 10100000 | A0 |
| M (21) | 10100001 | A1 |
| < (22) | 10100010 | A2 |
| > (23) | 10100011 | A3 |
| ' (24) | 10100100 | A4 |
| + (25) | 10100101 | A5 |
| − (26) | 10100110 | A6 |
| * (27) | 10100111 | A7 |
| / (28) | 10101000 | A8 |
| SP (29) | 10101001 | A9 |
| SP (30) | 10101010 | AA |
| SP (31) | 10101011 | AB |
| SP (32) | 10101100 | AC |
| Na.K (33) | 10101101 | AD |
| Na.K.Cl (34) | 10101110 | AE |
| START | 10110010 | B2 |
| SAMPLING STOP | 10110011 | B3 |
| STOP | 10110100 | B4 |
| ENTER | 10110101 | B5 |
| STAT | 10110110 | B6 |
| OPERATION MONITOR | 10110111 | B7 |
| ROUTINE | 10111000 | B8 |
| QC | 10111001 | B9 |
| MONITOR | 10111010 | BA |
| PARAM | 10111011 | BB |
| MAINTE | 10111100 | BC |
| BUZ.OFF | 10111101 | BD |
| 0 | 11000000 | C0 |
| 1 | 11000001 | C1 |
| 2 | 11000010 | C2 |
| 3 | 11000011 | C3 |
| 4 | 11000100 | C4 |
| 5 | 11000101 | C5 |
| 6 | 11000110 | C6 |
| 7 | 11000111 | C7 |
| 8 | 11001000 | C8 |
| 9 | 11001001 | C9 |
| . | 11001010 | CA |
| − | 11001011 | CB |
| C [clear] | 11001100 | CC |
| < | 11001101 | CD |
| > | 11001110 | CE |
| CONTINUE | 11010000 | D0 |
| NEXT | 11010001 | D1 |
| BACK | 11010010 | D2 |
| COPY | 11010011 | D3 |

Figure 3:
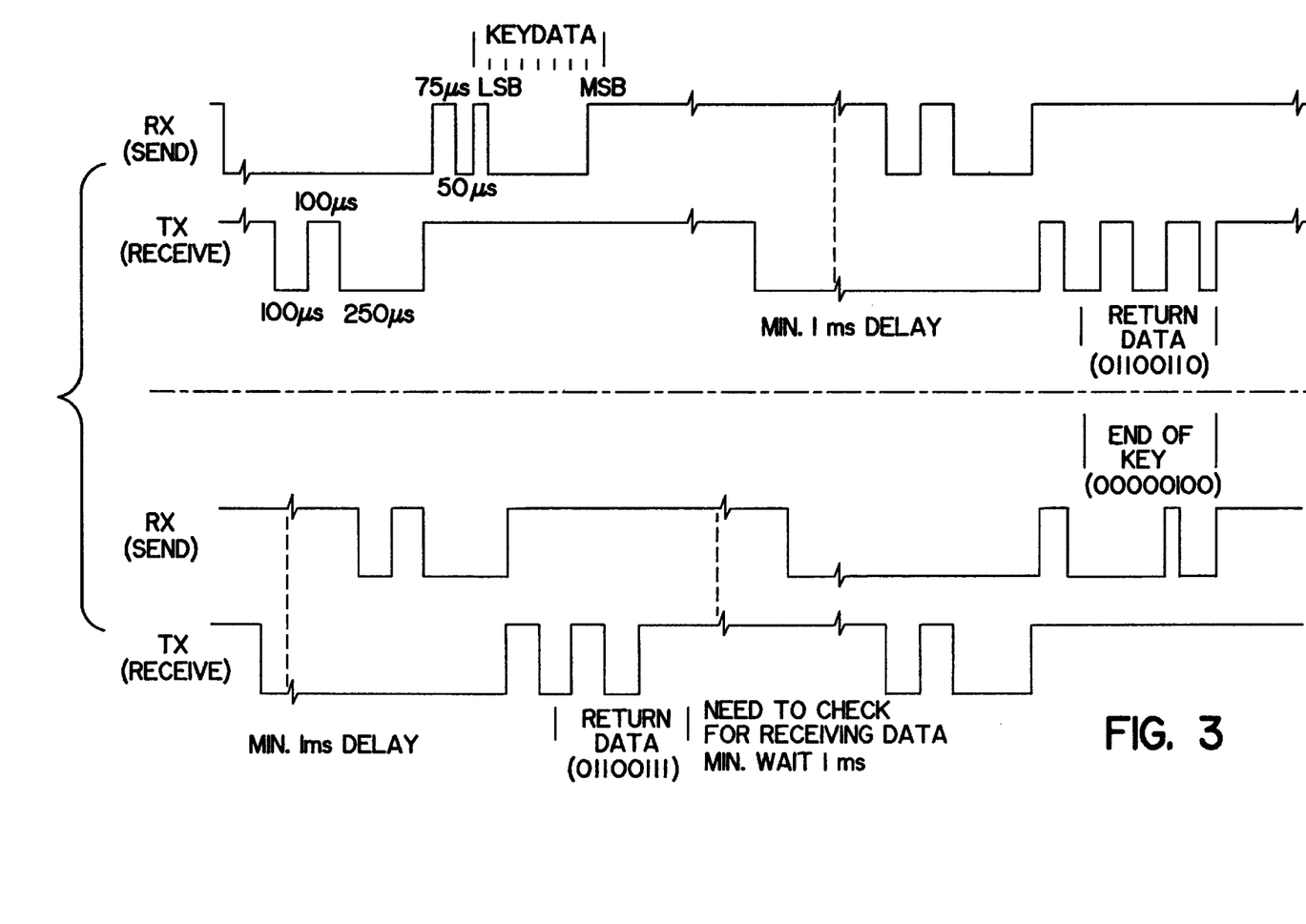
FIG. 3 illustrates a data transmission format useful in understanding the present invention.

The format for character transmission through port 22 is illustrated in FIG. 3. Therefore in order to interface with the 717, all the enhancement system need be able to do is to identify outgoing characters at port 20 and be able to reproduce the incoming characters of Table 1 and FIG. 3 at port 22.

Figure 1D:
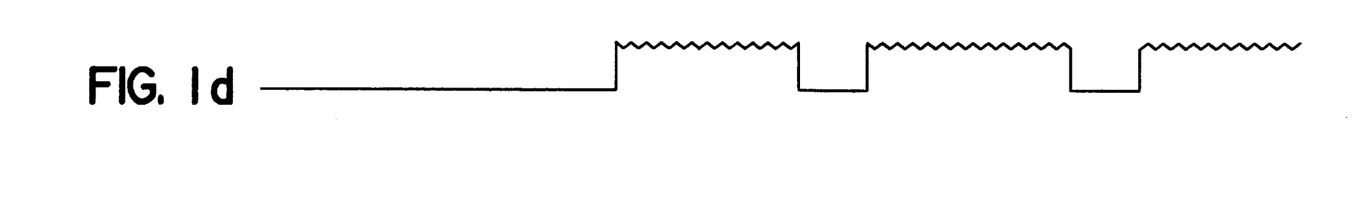

The video output at port 20 is buffered to reduce the likelihood of any adverse consequences to the port 20 driver circuitry (not shown) in the 717. The buffer circuitry is illustrated in FIG. 4. Ten operational amplifiers 50, 51, 52, 53, 54, 55, 56, 57, 58 and 59 are configured as illustrated. The resistors 60, 61 and 62 are 150 Ω, 1%, ¼ watt resistors. The capacitor is a 0.033 µF, 10%, 100 VDC capacitor. The video, FIG. 1d, is coupled from µC 18 of the 717 to an input terminal of amplifier 50, the output terminal of which is coupled to an input terminal of amplifier 51. The buffered video signal appears across resistor 60 and the VIDEO and GrouND terminals of a connector 63. The 16 MHz clock from µC 18 of the 717 is coupled to an input terminal of an amplifier 53. The buffered 16 MHz clock appears across resistor 61 and the 16 MHz and GND terminals of connector 63. The Display Enable signal from µC 18 is coupled to an input terminal of operational amplifier 56. The buffered Display Enable signal appears across resistor 62 and the DE and GND terminals of connector 63. The HS and VS signals are coupled directly from the µC 18 to the HS and VS terminals, respectively, of connector 63. The HS and VS signals thus appear across the HS terminal and GND, and the VS terminal and GND, respectively, of connector 63. Amplifiers 50–59 illustratively are a National Semiconductor type 74HCT244 integrated circuit.

The HS, VS, DE, VIDEO and 16 MHz signals from the circuit illustrated in FIG. 4 are coupled through a connector 70 of FIG. 5a to the circuit of FIGS. 5a–e. Referring to FIG. 5a, each of these signals is coupled through a respective 47a resistor 71, 72, 73, 74, 75 to a respective terminal HS, VS, DE, VIDEO and 16 MHz. Each of these terminals is clamped 0.6V above Vcc by a respective diode 76, 77, 78, 79, 80. HS and VS are each clamped 0.6V below GrouND by respective diodes 81 and 82. Respective 150a resistors 83, 84 and 85 are coupled between DE, VIDEO and 16 MHz and ground. The µC 18-to-keyboard transmit(Tx) and Receive(Rx) terminals of the µc 18 embedded in the 717 are coupled through respective 47 Ω resistors to the Tx and Rx terminals, respectively, of FIG. 5a. Tx and Rx are clamped 0.6V above Vcc by diodes 86, 87. Tx and Rx are clamped 0.6V below GND by diodes 88, 89. Illustratively, all the diodes are 1N4148 diodes.

Figure 5B:
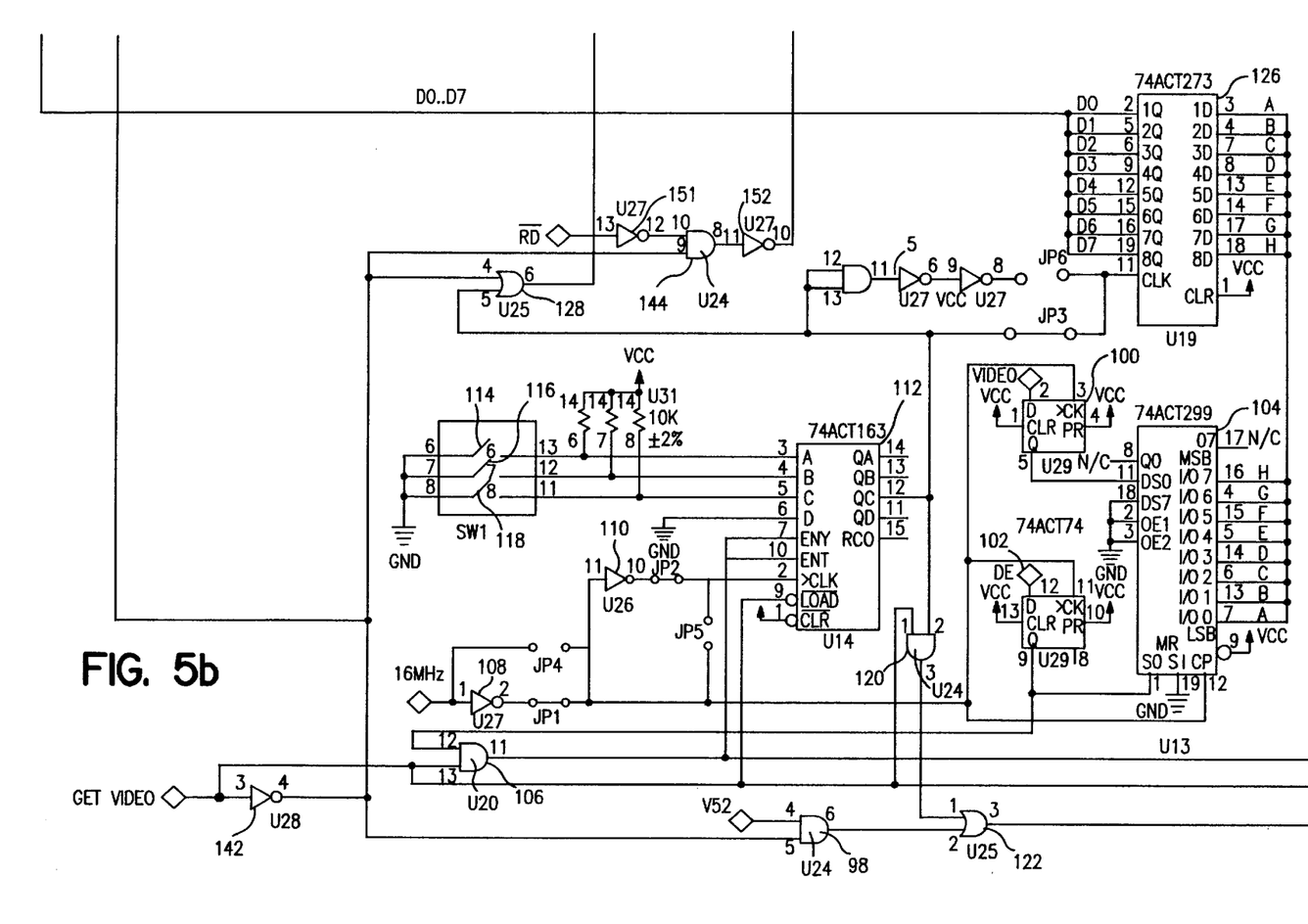

HS is coupled from FIG. 5a to a non-inverting (+) input terminal, pin 7, of a difference amplifier 90, illustratively a National Semiconductor type LM339N difference amplifier. FIG. 5d. The inverting (−) input terminal of amplifier 90 is coupled through a 100KΩ resistor to Vcc and through a 220KΩ resistor to GND. The output terminal of amplifier 90 is coupled through a 3KΩ pull-down resistor to Vcc and directly to pin 14, Port 3.4, T0, of a µC92, illustratively, a Dallas Semiconductor DS80C320 eight bit µC.

VS is coupled to the +input terminal of a difference amplifier 94 and to the − input terminal of a difference amplifier 96. The − and + input terminals of difference amplifiers 94, 96, respectively, are coupled through a common 100KΩ resistor to Vcc and through a common 220KΩ resistor to GND. The output terminal of amplifier 94 is coupled through a 3KΩ pull-down resistor to Vcc and directly to an input terminal, pin 4, of an AND gate 98 (FIG. 5b), illustratively a National Semiconductor DM74LS08N quad two input AND gate. The output terminal of amplifier 96 is coupled through a 3KΩ, pull-down resistor to Vcc and to pin 8, P1.7, of µC92. The output terminal of amplifier 94 (FIG. 5d) forms the VS2 terminal. VS2 is coupled to the other input terminal of AND gate 98.

VIDEO and DE are coupled to the D input terminals of D flip-flops (DFFs) 100, 102, respectively. DFFs 100, 102 illustratively are a National Semiconductor type DM74ACT74N dual DFF. The Q output terminal of DFF 100 is coupled to the DS0 terminal of an eight input universal shift/storage register 104, illustratively a National Semiconductor type DM74ACT299N integrated circuit. The Q output terminal of DFF 102 is coupled to the S0 input terminal of register 104 and to an input terminal of an AND gate 106, illustratively of the same type as AND gate 98.

16 MHz is coupled to an input terminal of an inverter 108, illustratively an element of a National Semiconductor type DM74LS04N hex inverter. The output terminal of inverter 108 is coupled to the clock input terminals of DFFs 100, 102, to the CP terminal of register 104, and to an input terminal of an inverter 110, illustratively of the same type as inverter 108. The output terminal of inverter 110 is coupled to the CLocK input terminal of a four-bit binary counter 112, illustratively, a National Semiconductor type DM74ACT163N four-bit binary counter. The A, B and C input terminals of counter 112 are coupled through respective 10KΩ, 2% resistors to Vcc and to poles of respective switches 114, 115, 116, the other poles of which are coupled to GND. Switches 114, 115 and 116 permit the initial state of counter 112 to be set. The D input terminal of counter 112 is coupled to GND. The output terminal of AND gate 106 is coupled to the ENY and ENT terminals of counter 112. The QC output terminal of counter 112 is coupled to an input terminal of an AND gate 120, the output terminal of which is coupled to an input terminal of an OR gate 122. AND gate 120 illustratively is a type DM74LS08N AND gate. OR gate 122 illustratively is a National Semiconductor type DM74LS32N quad two input OR gate. The output terminal of AND gate 98 is coupled to the remaining input terminal of OR gate 122. The QC terminal of counter 112 is also coupled to the CLocK input terminal of an eight bit register 126 such as, for example, a National Semiconductor type DM74ACT273N eight bit register. The I/O0–I/O7 terminals, pins 7, 13, 6, 14, 5, 15, 4 and 16, respectively, of counter 104 are coupled to the 1D–8D terminals, pins 3, 4, 7, 8, 13, 14, 17 and 18, respectively, of register 126. The 1Q–8Q terminals, pins 2, 5, 6, 9, 12, 15, 16, and 19, respectively, of register 126 are coupled, respectively, to the system bus D0–D7 lines. The QC terminal of counter 112 is also coupled to an input terminal of an OR gate 128.

Figure 5C:
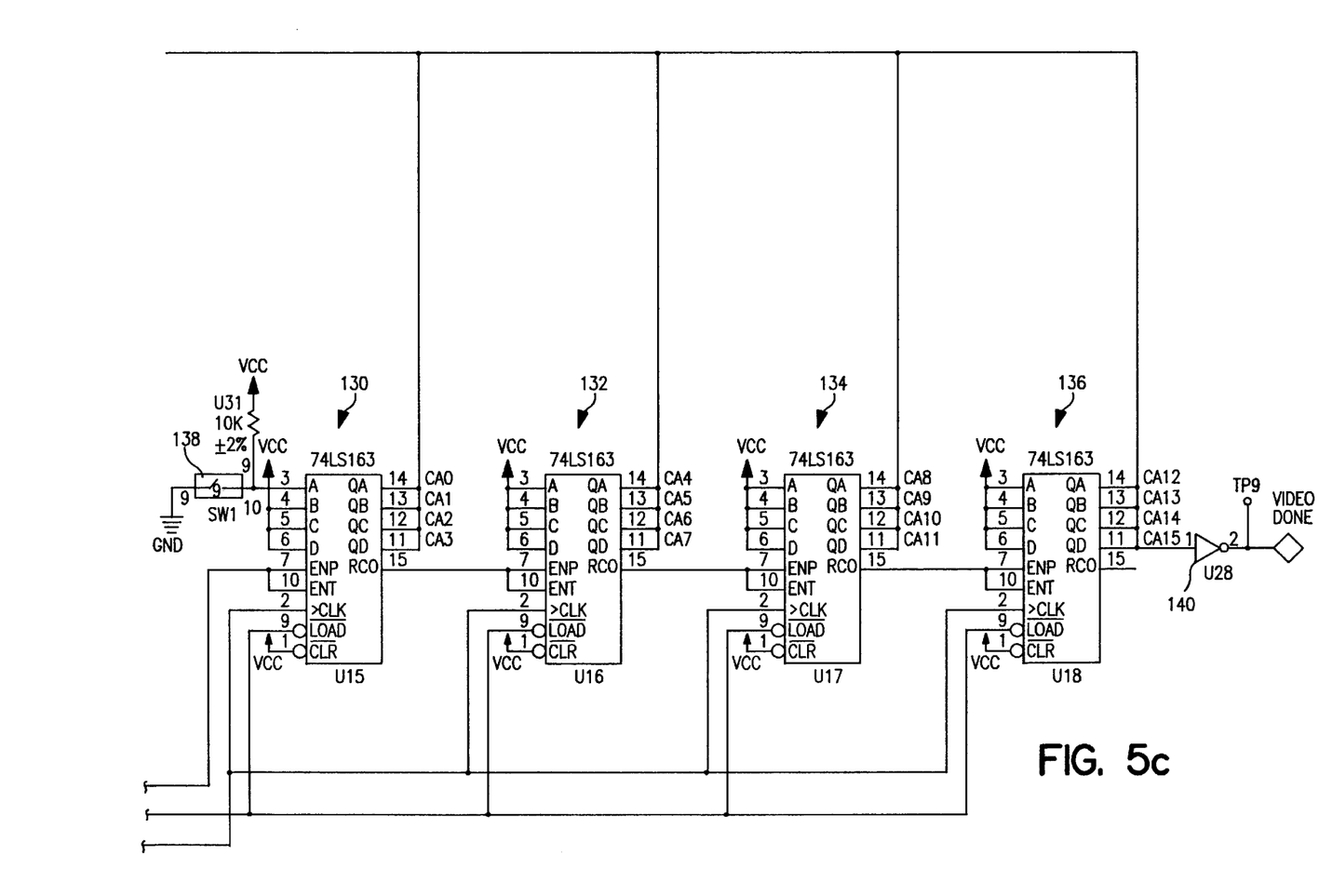
Figure 5D:
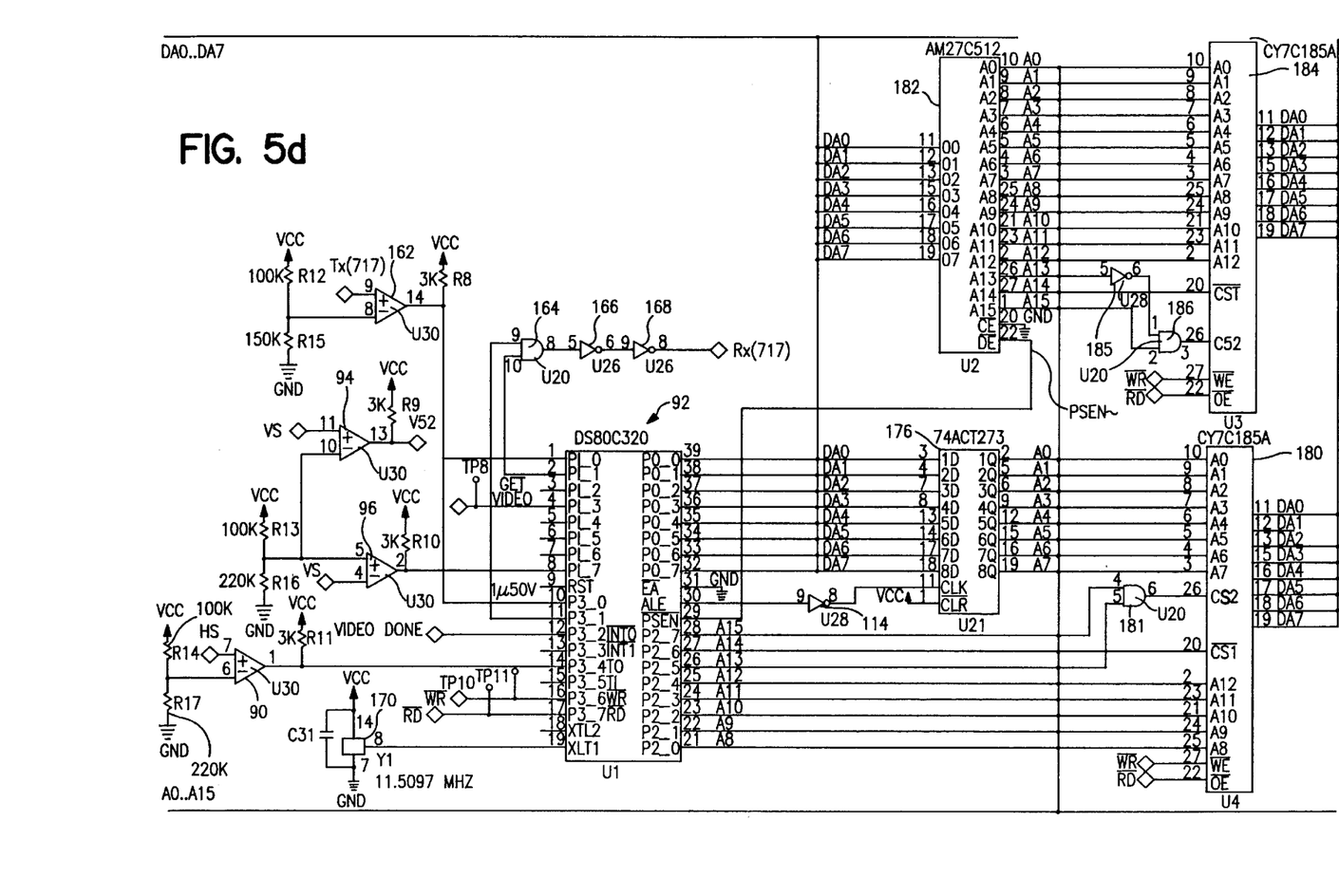
Figure 5E:
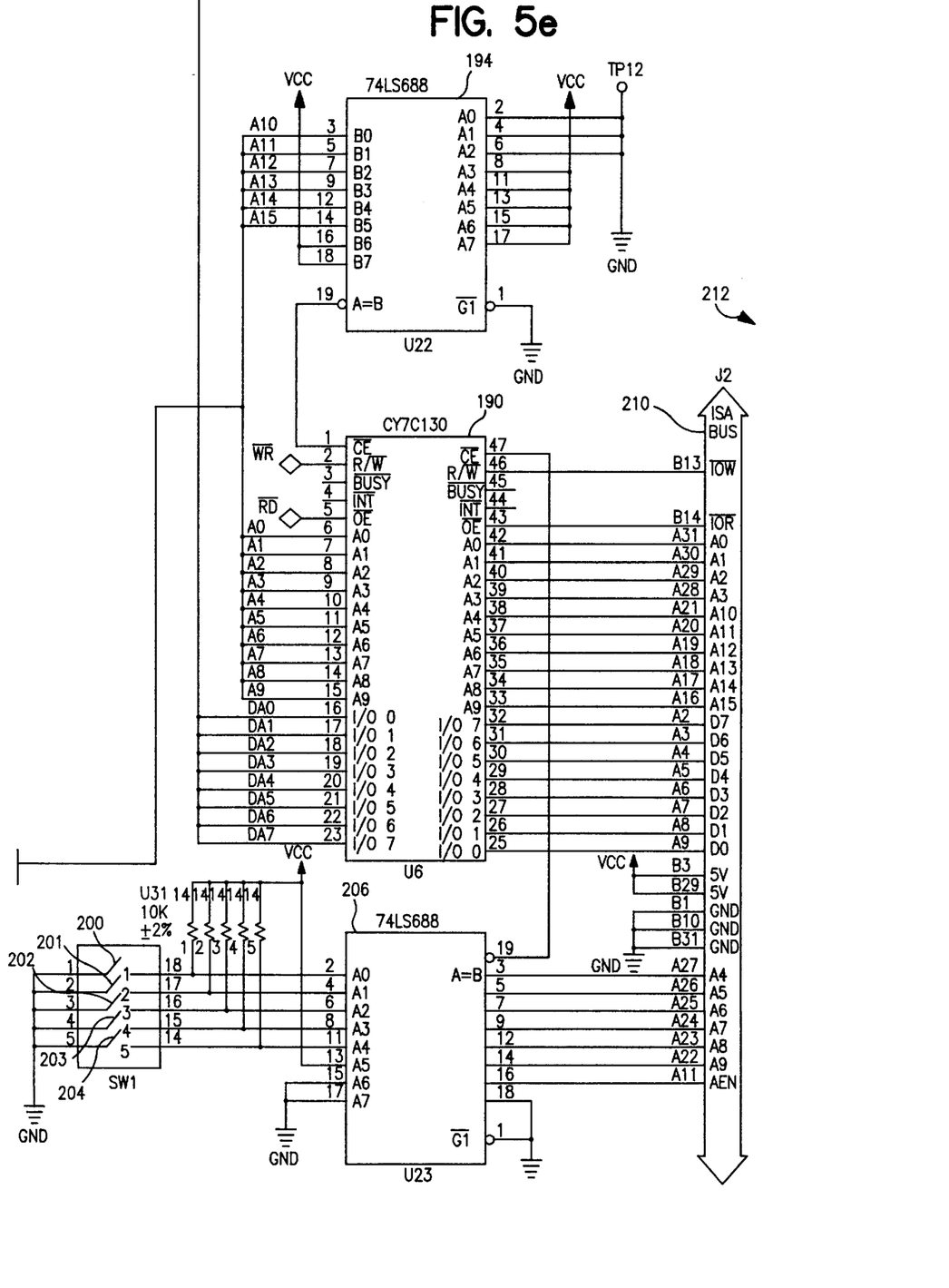

Referring to FIG. 5c, the QA–QD terminals, pins 14–11 respectively, of a four bit binary counter 130, the QA–QD terminals, pins 14–11 respectively, of a four bit binary counter 132, the QA–QD terminals, pins 14–11 respectively, of a four bit binary counter 134, and the QA–QD terminals, pins 14–11 respectively, of a four bit binary counter 136 are coupled respectively to the system bus CA0–CA15 lines. The B, C and D terminals, pins 4–6, of counter 130 and the A–D terminals, pins 3–6, respectively, of counters 132, 134 and 136 are all coupled to Vcc. The A terminal of counter 130 is coupled through a 10KΩ, 2% pull-down resistor to Vcc and to one terminal of a switch 138, the other terminal of which is coupled to GND. Switch 138 permits the initial state of counter 130 to be set. The clock terminals of counters 130, 132, 134, 136 are all coupled to the output terminal of OR gate 122 (FIG. 5b). The ENP and ENT terminals of counter 130 are coupled to the output terminal of AND gate 106. The RCO terminal of counter 130 is coupled to the ENP and ENT terminals of counter 132. The RCO terminal of counter 132 is coupled to the ENP and ENT terminals of counter 134. The RCO terminal of counter 134 is coupled to the ENP and ENT terminals of counter 136. The $\overline{\text{CleaR}}$ terminals of counters 130, 132, 134 and. 136 are all coupled to Vcc. The QD terminal, pin 11, of counter 136 is also coupled to an input terminal of an inverter 140. The output terminal of inverter 140 forms the system VIDEO DONE terminal. Counters 130, 132, 134 and 136 illustratively are National Semiconductor type DM74LS163N four bit binary counters. Inverter 140 illustratively is an element of a National Semiconductor type DM74LS04N hex inverter.

A GET VIDEO signal (FIG. 5b) from P1.3 of μC92 (FIG. 5d) is coupled to an input terminal of an inverter 142, to an input terminal of AND gate 106, to the $\overline{\text{LOAD}}$ terminals of counters 112, 130, 132, 134 and 136, and to an input terminal of AND gate 120. The output terminal of inverter 142 is coupled to the remaining input terminal of AND gate 98, to the remaining input terminal of OR gate 128, to an input terminal of an AND gate 144, and to the $\overline{\text{G2}}$ input terminals of three octal tri-state buffer integrated circuits 146, 148, 150 (FIG. 5a). The system $\overline{\text{ReaD}}$ terminal is inverted by an inverter 151 and coupled to the other input terminal of AND gate 144. Inverters 142 and 151 illustratively are elements of a type DM74LS04N hex inverter. AND gate 144 illustratively is an element of a National Semiconductor type DM74LS08N quad two input AND gate. Octal tri-state buffers 146, 148, 150 illustratively are National Semiconductor type DM74LS541N buffers.

The output terminal of AND gate 144 is coupled to an input terminal of an inverter 152, for example a type DM74LS04N inverter. The output terminal of inverter 152 is coupled to the $\overline{\text{G2}}$ input terminals of three octal tri-state buffers 154, 156, 158 (FIG. 5a), and to the $\overline{\text{Output Enable}}$ terminal of a 32K×8 bit RAM 160. Buffers 154, 156, 158 illustratively are type DM74LS541N buffers.

RAM 160 illustratively is a cypress type CY7C199-55PC RAM. The A1–A8 terminals, pins 2–9 respectively, of buffer 146 are coupled to the D0–D7 lines, respectively, of the system bus. The Y1–Y8 terminals, pins 18–11 respectively, of buffer 146 are coupled to the BD0–BD7 lines, respectively, of the system bus. The A1–A8 terminals, pins 2–9 respectively, of buffer 154 are coupled to the BD0–BD7 lines, respectively, of the system bus. The Y1–Y8 terminals, pins 18–11 respectively, of buffer 154 are coupled to the DA0–DA7 lines, respectively, of the system bus. The A1–A8 terminals, pins 2–9 respectively, of buffer 148 are coupled to twice CA0–CA7 lines, respectively, of the system bus. The A1–A8 terminals, pins 2–9 respectively, of buffer 150 are coupled to the CA8–CA15 lines, respectively, of the system bus. The CA15 line of the system bus is also coupled to the $\overline{\text{G1}}$ terminals of buffers 146, 148, 150. The Y1–Y8 terminals, pins 18–11 respectively, of buffer 148 and the Y1–Y8 terminals, pins 18–11 respectively, of buffer 150 are coupled to the BA0–BA15 lines, respectively, of the system bus. The Y1–Y8 terminals, pins 18–11 respectively, of buffer 156 and the Y1–Y8 terminals, pins 18–11 respectively, of buffer 158 are coupled to the BA0–BA15 lines, respectively, of the system bus. The A1–A8 terminals, pins 2–9 respectively, of buffer 156 and the A1–A8 terminals, pins 2–9 respectively, of buffer 158 are coupled to the A0–A15 lines, respectively, of the system bus. The $\overline{\text{G1}}$ terminals, pins 1, of buffers 154, 156, 158 are all coupled to the A15 line of the system bus. The A0–A14 and Chip Select terminals, pins 21, 23–26, 1–10 and 20, respectively, of RAM 160 are coupled to the BA0–BA15 lines, respectively, of the system bus. The $\overline{\text{CS}}$ terminal of RAM 160 is pulled up to Vcc through a 3KΩ resistor. The $\overline{\text{Output Enable}}$ terminal of RAM 160 and the $\overline{\text{G2}}$ terminals of buffers 154, 156 and 158 are all coupled to the output terminal of inverter 152. FIG. 5b. The $\overline{\text{Write Enable}}$ terminal of RAM 160 is coupled to the output terminal of OR gate 128. The $\overline{\text{G2}}$ terminals of buffers 146, 148 and 150 are coupled to the output terminal of inverter 142. The I/O0–I/O7 terminals, pins 11–13 and 15–19 respectively, of RAM 160 are coupled to the BD0–D7 lines, respectively, of the system bus.

Referring again to FIG. 5d, Tx is coupled to a + input terminal of a difference amplifier 162, illustratively an LM339N. The − input terminal of amplifier 162 is coupled through a 100KΩ resistor to Vcc and through a 150KΩ resistor to GND. The output terminal of amplifier 162 is coupled through a 3KΩ pull-down resistor to Vcc and directly to input terminals P1.0 and P3.0, pins 1 and 10 respectively, of μC92. Terminals P1.1 and P3.1, pins 2 and 11 respectively, of μC92 are coupled to the input terminals of an AND gate 164, the output terminal of which is coupled through two series inverters 166, 168 to the system Rx terminal. AND gate 164 illustratively is a type DM74LS08N AND gate. Inverters 166, 168 illustratively are type DM74LS14N inverters. An 11.5097 MHz crystal 170 is coupled to the XTL1 terminal, pin 19 of μC92. The system GET VIDEO and VIDEO DONE terminals are coupled to the P1.3 and P3.2 (INTerrupt 0) terminals, pins 4 and 12, respectively, of μC92. The system WRite and ReaD terminals are coupled to P3.6 and P3.7, pins 16 and 17, respectively, of μC92. The P0.0–P0.7 terminals, pins 39–32 respectively, of μC92 are coupled to the DA0–DA7 lines, respectively of the system bus. The EA terminal, pin 31, of μC92 is coupled to GND. The Address Latch Enable terminal, pin 30, of μC92 is coupled through an inverter 174 to the CLocK terminal, pin 11, of an eight bit register 176. Register 176 illustratively is a National Semiconductor type DM74ACT273N register. The P2.0–P2.7 terminals, pins 21–28 respectively, of μC92 are coupled to the A8–A15 lines, respectively, of the system bus. The 1D–8D terminals, pins 3, 4, 7, 8, 13, 14, 17 and 18, respectively, of register 176 are coupled to the DA0–DA7 lines, respectively, of the system bus. The 1Q–8Q terminals, pins 2, 5, 6, 9, 12, 15, 16 and 19, respectively, of register 176 are coupled to the A0–A7 lines, respectively, of the system bus, and to the A0–A7 terminals, pins 10–3 respectively, of an 8K×8 bit RAM 180 such as, for example, a Cypress type CY7C185A-55PC 8K×8 bit RAM. The A8–A12 terminals, pins 25, 24, 21, 23 and 2 respectively, of RAM 180 are coupled to the A8–A12 lines of the system bus. The Chip Select 1 terminal, pin 20, of RAM 180 is coupled to the A14 line of the system bus. The A13 and A15 lines of the system bus are coupled to the input terminals of a two input AND gate 181, such as a type DM74LS08N AND gate. The output terminal of AND gate 181 is coupled to the CS2 input terminal, pin 26, of RAM 180. The DA0–DA7 terminals, pins 11–13 and 15–19 respectively, of RAM 180 are coupled to the DA0–DA7 lines, respectively, of the system bus.

The system bus DA0–DA7 lines are also coupled to the 00–07 terminals, pins 11–13 and 15–19 respectively, of a 64K×8 bit EPROM 182 such as, for example, an Advanced Micro Devices type AM27C512-150DC EPROM. The OE terminal, pin 22 of EPROM 182 is coupled to the Program Store Enable terminal, pin 29, of μC92. The A0–A15 terminals, pins 10–3, 25, 24, 21, 23, 2, 26, 27 and 1 respectively, of EPROM 182 are coupled to the A0–A15 lines, respectively, of the system bus. The A0–A12 lines of the system bus are coupled to the A0–A12 terminals, pins 10–3, 25, 24, 21, 23 and 2 respectively, of an 8K×8 bit RAM 184. RAM 184 illustratively is the same type as RAM 180. The DA0–DA7 terminals, pins 11–13 and 15–19 respectively, of RAM 184 are coupled to the DA0–DA7 lines, respectively, of the system bus. The A13 line of the system bus is inverted by an inverter 185, such as a type DM74LS04N inverter, and the inverted A13 signal is coupled to one input terminal of a two input. AND gate 186, such as a type DM74LS08N AND gate. The A15 line of the system bus is coupled to the other input terminal of AND gate 186. The output terminal of AND gate 186 is coupled to the CS2 input terminal, pin 26, of RAM 184. The A14 line of the system bus is coupled the CS1 terminal, pin 20, of RAM 184. The Write Enable terminals, pins 27, of RAMs 180 and 184 are coupled to the system Write terminal. The Output Enable terminals, pins 22, of RAMs 180 and 184 are coupled to the system ReaD terminal.

The DA0–DA7 lines of the system bus are coupled to the I/O0–I/O7 terminals, pins 16–23 respectively, of a 1K×8 bit dual port RAM 190, such as, for example, a Cypress type CY7C130-45PC 1K×8 bit dual port RAM. The A0–A9 lines of the system bus are coupled to the A0–A9 terminals, pins 6–15 respectively, of dual port RAM 190. The Read/Write terminal and the Output Enable terminal, pins 2 and 5 respectively, of dual port RAM 190 are coupled to the system Write and ReaD terminals, respectively. The A10–A15 lines of the system bus are coupled to the B0–B5 terminals, pins 3, 5, 7, 9, 12 and 14 respectively, of an eight bit comparator 194, such as, for example, a Texas Instruments type DM74LS688N eight bit comparator. The A3–A7, B6 and B7 terminals, pins 8, 11, 13, 15, 17, 16 and 18 respectively, of comparator 194 are coupled to Vcc. The A0–A2 terminals, pins 2, 4 and 6 respectively, of comparator of 194 are coupled to GND. The G1 terminal, pin 1, of comparator 194 is coupled to GND. The A=B terminal, pin 19, of comparator 194 is coupled to the CE terminal, pin 1, of dual port RAM 190.

Poles of five switches 200, 201, 202, 203, 204 are coupled to the A0–A4 input terminals, pins 2, 4, 6, 8 and 11 respectively, of an eight bit comparator 206 which illustratively is the same type as eight bit comparator 194. The other poles of switches 200–204 are coupled to GND. Switches 200–204 establish the address of the interface of the illustrated embodiment on the PC bus 210. Terminals A0–A4 of comparator 206 are also coupled through respective 10KΩ 2% pull-down resistors to Vcc. Terminal A5, pin 13, of comparator 206 is coupled to Vcc. Terminals A6–A7, pins 15 and 17 respectively, of comparator 206 are coupled to GND. The CE terminal, pin 47, of dual port RAM 190 is coupled to the A=B terminal, pin 19 of comparator 206. The G1 terminal, pin 1, of comparator 206 is coupled to GND. Pin 18 of comparator 206 is coupled to GND.

Figure 6:
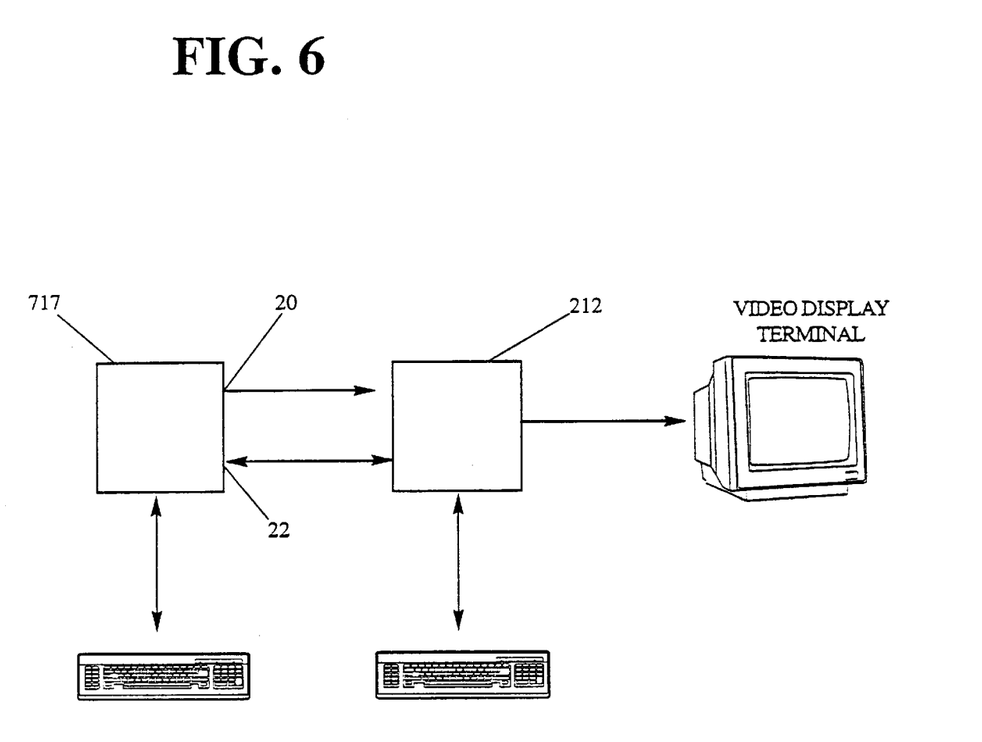
FIG. 6 illustrates a system constructed according to the present invention; and, FIG. 7 illustrates a flow chart outlining a method according to the present invention.

Referring to FIG. 6, the READ/Write, OE, A0–A9 and I/O7–I/O0 terminals, pins 46 and 43–25 respectively, of dual port RAM 190 and pins 3, 5, 7, 9, 12, 14 and 16 of comparator 206 are coupled to the IOR, IOW, A0–A3, A10–A15, D7–D0, A4–A9 and A ENable lines of the Industry Standards Association PC bus 210 of the PC 212, for example, a Hewlett-Packard Vectra 80486-66 MHz PC, external to the 717, and equipped with a video display terminal and a keyboard.

The attached 67 page Exhibit A plus four page index explains the interface of the illustrated embodiment in greater detail.

The attached 240 page Exhibit B explains the program which resides in PC 212.

The attached 90 page Exhibit C lists the contents of EPROM 182.

What is claimed is:

1. A method for providing communication between a first machine and a second, the method comprising coupling a first video display output of the first machine to a first input port of the second machine, generating at the first video display output first video display signals to couple the first video display signals to the second machine, converting said first video display signals generated by the first machine at the first video display output into first instructions and data and using the first instructions and data to operate the second machine.

2. The method of claim 1 wherein the second machine has a second video display output, wherein the steps of converting the first video display signals into first instructions and data and using the first instructions and data to operate the second machine comprise converting the first video display signals into first instructions and data and using the first instructions and data to provide second video display signals at the second video display output.

3. The method of claim 2 further comprising the steps of entering the second instructions and data at a second input port of the second machine, converting the second instructions and data in the second machine into third instructions and data, providing the third instructions and data to a third input port of the first machine, and using the third instructions and data to operate the first machine.

4. The method of claim 3 wherein the step of entering the second instructions and data at a second input port of the second machine comprises coupling a keyboard to the second input port of the second machine and entering the second instructions and data through the keyboard.

5. The method of claim 4 wherein the first instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels of the n×m matrix, identifying a respective character based upon the status of those pixels, and compiling the thus-identified characters into said first instructions and data.

6. The method of claim 2 wherein the first instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels of the n×m matrix, identifying a respective character based upon the status of those pixels, and compiling the thus-identified characters into said first instructions and data.

7. The method of claim 3 wherein the first instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels, of the n×m matrix, identifying a respective character based upon the status of those pixels, and compiling the thus-identified characters into said first instructions and data.

8. The method of claim 1 further comprising the steps of entering second instructions and data at a second input port of the second machine, converting the second instructions and data in the second machine into third instructions and data, providing the third instructions and data to a third input port of the first machine, and using the third instructions and data to operate the first machine.

9. The method of claim 8 wherein the step of entering the second instructions and data at a second input port of the second machine comprises coupling a keyboard to the second input port of the second machine and entering the second instructions and data through the keyboard.

10. The method of claim 9 wherein the first: instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels of the n×m matrix, identifying a respective character based upon the status of those pixels, and compiling the thus-identified characters into said first instructions and data.

11. The method of claim 8 wherein the first instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels of the n×m matrix, identifying a respective character based upon the status of those pixels, and compiling the thus-identified characters into said first instructions and data.

12. The method of claim 1 wherein the first instructions and data comprise combinations of characters of a set of characters, and the step of converting the first video display signals generated by the first machine at the first video display output into first instructions and data comprises dividing the characters into n row by m column matrices of pixels, determining which pixels of a matrix uniquely identify each respective character of the set, examining those pixels of the n×m matrix, identifying a respective character based upon the status of those pixels, and compiling the thus-identified characters into said first instructions and data.

13. A system for providing communication between a first machine and a second, the system comprising first means for coupling a first video display output of the first machine to a first input port of the second machine, the first machine generating at its first video display output first video display signals, the first video display signals thereby being coupled to said first input port of the second machine, the second machine including second means for converting first video display signals generated by the first machine at the first video display output into first instructions and data and third means for using the first instructions and data to operate the second machine.

14. The system of claim 13 wherein the second machine comprises a second video display output, the second and third means converting the first video display signals into first instructions and data and using the first instructions and data to provide second video display signals at the second video display output.

15. The system of claim 14 wherein the second machine comprises a second input port, further comprising fourth means for entering second instructions and data at the second input port of the second machine, and fifth means for converting the second instructions and data in the second machine into third instructions and data and for providing the third instructions and data to a third input port of the first machine, the first machine using the third instructions and data to operate the first machine.

16. The system of claim 15 wherein the fourth means comprises a keyboard coupled to the second input port of the second machine.

17. The method of claim 16 wherein the first instructions and data comprise combinations of characters of a set of characters, the second means for converting first video display signals into first instructions and data comprises means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first instructions and data.

18. The method of claim 14 wherein the first instructions and data comprise combinations of characters of a set of characters, the second means for converting first video display signals into first instructions and data comprises second means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first instructions and data.

19. The method of claim 15 wherein the first instructions and data comprise combinations of characters of a set of characters, the second means for converting first video display signals into first instructions and data comprises means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first: instructions and data.

20. The system of claim 13 wherein the second machine comprises a second input port, further comprising fourth means for entering second instructions and data at the second input port of the second machine, and fifth means for converting the second instructions and data in the second machine into third instructions and data and for providing the third instructions and data to a third input port of the first machine, the first machine using the third instructions and data to operate the first machine.

21. The system of claim 20 wherein the fourth means comprises a keyboard coupled to the second input port of the second machine.

22. The method of claim 21 wherein the first instructions and data comprise combinations of characters of a set of characters, the second means for converting first video display signals into first instructions and data comprises means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first instructions and data.

23. The system of claim 13 wherein the first instructions and data comprise combinations of characters of a set of characters, the second means for converting first video display signals into first instructions and data comprises means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first instructions and data.

24. The method of claim 20 wherein the first instructions and data comprise combinations of characters of a set of characters, the second means for converting first video display signals into first instructions and data comprises means for dividing the characters into n row by m column matrices of pixels, for determining which pixels of a matrix uniquely identify each respective character of the set, for examining those pixels of the n×m matrix, for identifying a respective character based upon the status of those pixels, and for compiling the thus-identified characters into said first instructions and data.

\* \* \* \* \*